F. F. GREEN.
HOE ATTACHMENT FOR CULTIVATORS.
APPLICATION FILED AUG. 4, 1908. RENEWED NOV. 3, 1910.
994,151.
Patented June 6, 1911.
2 SHEETS—SHEET 1.
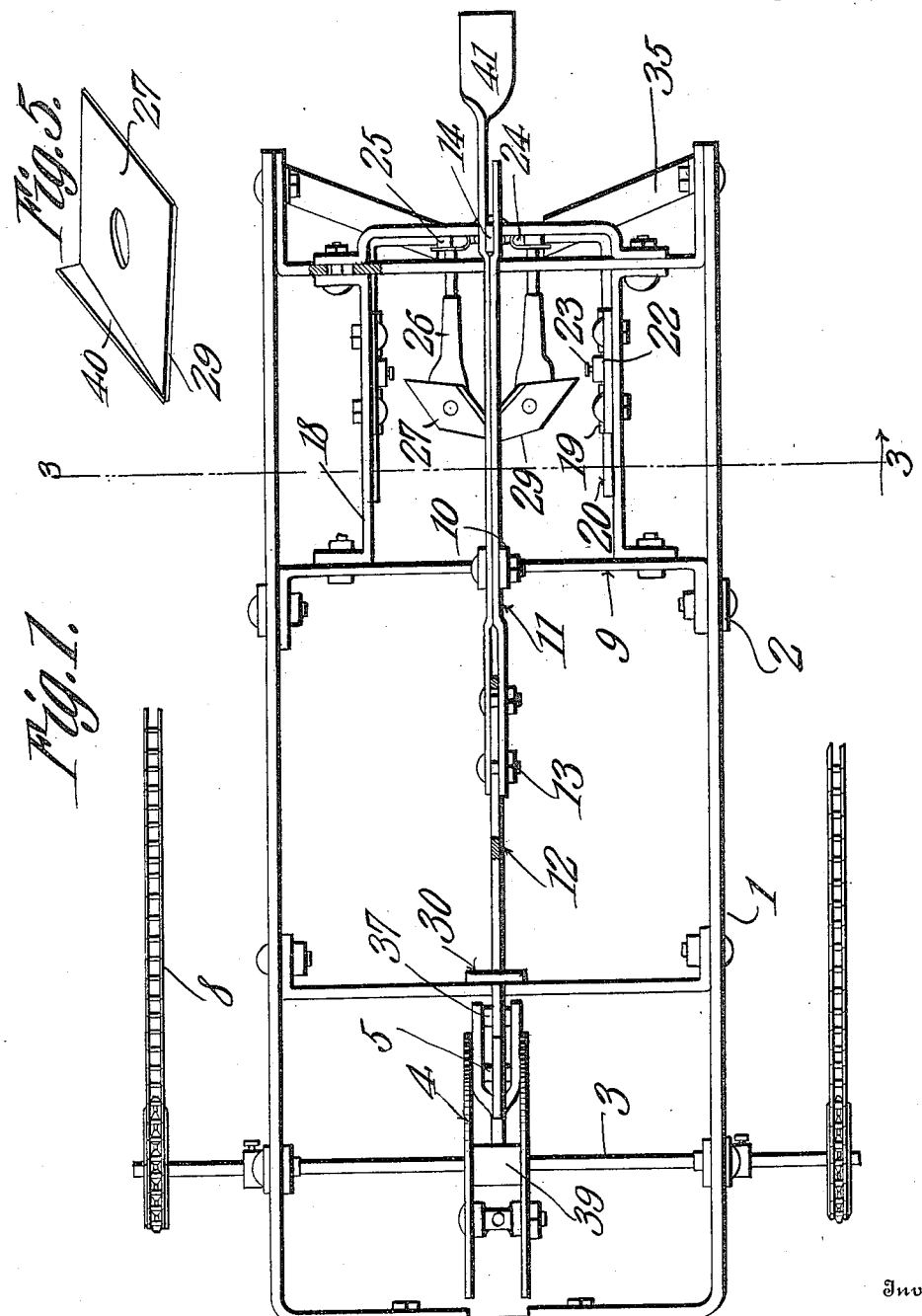
Witnesses
Inventor
Furney F. Green.
By C. A. Snow & Co.,
Attorneys

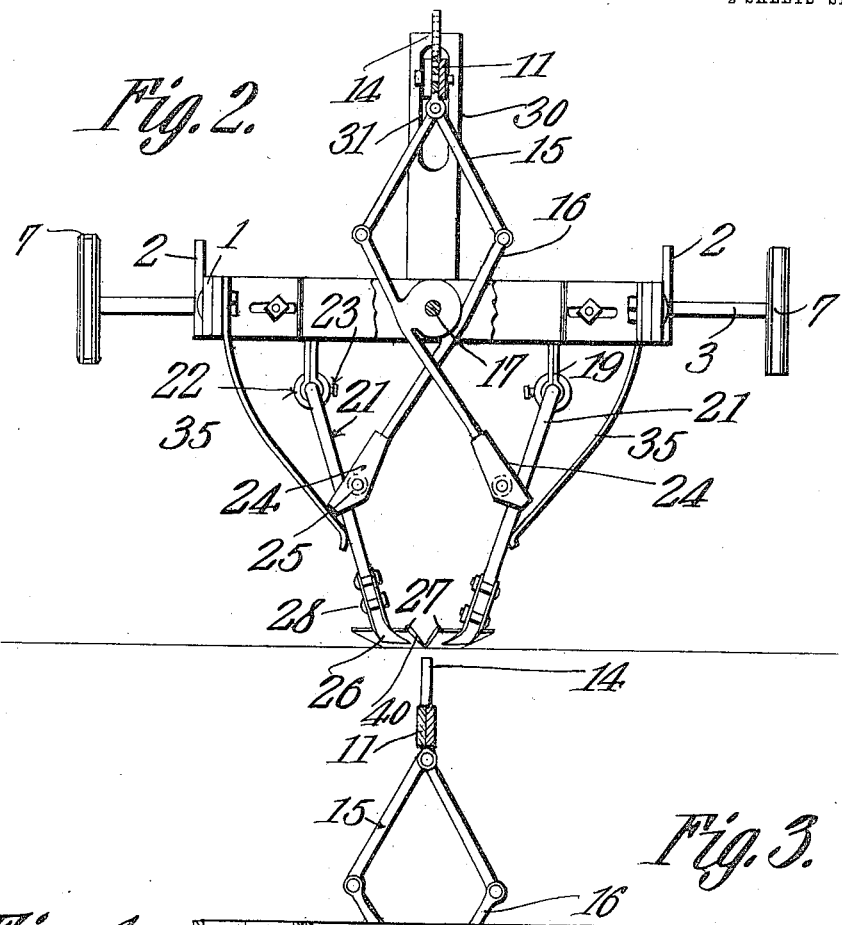

UNITED STATES PATENT OFFICE.

FURNEY F. GREEN, OF COALGATE, OKLAHOMA.

HOE ATTACHMENT FOR CULTIVATORS.

994,151. Specification of Letters Patent. Patented June 6, 1911.

Application filed August 4, 1908, Serial No. 446,951. Renewed November 3, 1910. Serial No. 590,535.

*To all whom it may concern:*

Be it known that I, FURNEY F. GREEN, a citizen of the United States, residing at Coalgate, in the county of Coal and State of Oklahoma, have invented a new and useful Hoe Attachment for Cultivators, of which the following is a specification.

This invention has relation to hoe attachment for cultivators and it consists in the novel construction and arrangement of its parts as hereinafter shown and described.

The object of the invention is to provide an attachment of the character indicated which is adapted to be applied to a wheel cultivator and which may be used for hoeing or cutting out any kind of soil.

After the standing plants have been operated upon by the hoe cultivator shovels following in the wake thereof agitate the soil to such an extent as to entirely remove the weeds and undesirable plants in the vicinity of those making up the crop.

The attachment is provided with various adjustments whereby the chopping hoe may be caused to operate at any desired distance below the surface of the soil and at such intervals as is deemed necessary and thus it will be seen that both the cultivator and the hoe attachment operate upon the standing plants substantially at the same time and that one operator may simplify the operation of the earth engaging element.

In the accompanying drawings; Figure 1 is a top plan view of the hoe attachment. Fig. 2 is a rear elevation of the same. Fig. 3 is a transverse sectional view of the same cut on the line 3—3 of Fig. 1. Fig. 4 is a vertical sectional view of a drum used upon the attachment. Fig. 5 is a perspective view of a hoe blade used upon the attachment.

The attachments consist of the frame 1 having the lugs 2 which are adapted to be connected with the frame of a cultivator. The shaft 3 is journaled for rotation at the forward end portion of the frame 1 and is provided at intermediate points with the parallel spaced disks 4. The bolts 5 are transversely disposed to the said disks 4 in the interventing space between them and are spaced at suitable intervals apart. The said disks 4 are provided with perforations for the reception of the said bolts 5. The single or double tree 6 is attached to the forward end of the frame 1. The sprocket wheels 7 are mounted upon the end portions of the shaft 3. The sprocket chains 8 pass around the wheels attached to the traction wheels or supporting wheels of the cultivator, not shown. The cross piece 9 is attached at its end to the sides of frame 1 and is provided at an intermediate point with an upstanding post 10. The lever 11 is fulcrumed in the upper end portion of the said post 10 and is provided with a longitudinally adjustable section 12, the forward end portion of which lies between the disks 4. The section or portion 12 is slotted and receives the transversely disposed bolts 13 which also pass through perforations in the said lever 11. By such means it is obvious that the section or portion 12 may be shifted or adjusted longitudinally with relation to said lever 11. Thus the said lever 11 as an entirety may be lengthened or shortened as desired. The arm 14 is pivotally connected to the rear end portion of the lever 11 and the toggle levers 15 are pivotally connected at their upper ends with the lower end of the said arm 14. The lower end of each of the toggle levers 15 is pivotally connected with an arm 16 which in turn is fulcrumed upon the bolts or pintle 17 located at the rear end of the frame 1. The inwardly disposed brackets 18 are located at the rear end portion of the frame 1. The bearings 19 are carried by the brackets 18. The upper end portions 20 of the standards 21 are journaled in the bearings 19 and are held therein by means of the adjustable collars 22 which are located between the bearings 19. Each of the said collars 22 is provided with a set screw 23 from which it is obvious that by adjusting the said collars 22 the said standards 21 may be shifted longitudinally and secured in their adjusted position. The lower ends of the arms 16 are provided with the cuffs 24 which in turn are provided with friction wheels 25 which bear against the sides of the standards 21.

The shanks 26 of the chopping hoes 27 are adjustably mounted upon the lower end portions of the standards 21. The said shanks 26 are held in position by means of the clamping bolts 28 and thus it will be seen that the said shanks may be adjusted longitudinally along the standard 21 and also may be turned and adjusted horizontally with relation to the same. The hoes 27 are substantially diamond or rhomb-shaped and are disposed with points toward each other and normally overlap each other. The said hoes 27 are provided with cutting edges 29. The upright 30 is mounted upon the frame 1 and has a slot 31 through which the section 12 of the lever 11 passes.

The springs 35 are attached to the rear end portions of the frame 1 and bear at their lower ends against the lower portions of the standards 21. The said springs 35 are under tension with a tendency to hold the lower portions of the said standards 21 together.

The arms 36 are pivotally mounted on the bolts 5 which pass transversely through the disks 4. The rollers 37 are journaled for rotation at the outer end portions of arms 36 and are adapted at times to engage the forward free end of the section 12 of the lever 11. The inner shorter ends of the arms 36 are adapted to engage the hub or sleeve 39 which is mounted upon the shaft 3 and is located between the disks 4. Fig. 4 in the drawing illustrates the manner in which arms 36 swing upon the bolts 35 as said disks 4 revolve. At the forward portions of the said disks the arms 36 swing substantially in the vertical position and as they are carried around under the hub 3 the shorter ends 38 of the said arms successively engage the hub 3 and thus the arms are held in substantially radial relation to the disks 4 and the roller 37 comes in contact with the under edge of the section 12 of lever 11.

The inner edges of the hoes 27 are provided with the vertically extending flanges 40 which are adapted to throw the dirt away from the plants between the hoes when the forward end portions of the hoes are brought together. The lever 11 is provided at its rear end with a foot treadle 41 upon which the operator may rest his foot whereby the lever 12 may be swung upon its fulcrum so that the forward end of the section 12 will be held above the path of the roller 37 carried by the arms 36.

From the foregoing description it is obvious that as the attachment is drawn along a row of plants and the shaft 3 is rotated, that the lever 11 will be rocked or swung upon its fulcrum in response to rollers 37 carried by the arms 35 coming in contact with under edge of the extension 12 thereof. Thus rear end of lever is caused to descend which in turn will carry down the toggle levers 15. The downward movement of the said toggle levers 15 will spread apart the upper end portions of the arms 16 and as the said arms are pivoted upon the pintle 17, the lower portions of the said arms 16 will also spread apart and move the standards 21 in a lateral direction against the tension of the springs 35. Thus the hoe blades 27 are moved apart and the plants occurring at these particular points in the row will be left standing.

Thus it will be seen that a hoeing attachment, of the character indicated, is provided, which in turn has movable parts so mounted as to be especially adapted to operate upon crops of different character. The plants that are cut out of the row by hoes 27 are cast to one side, and are effectually covered and destroyed by the cultivator shovels which follow after.

Having described my invention what I claim as new and desire to secure by Letters Patent is:

1. A device as described comprising a frame, standards pivoted thereto, chopping blades carried by the standards, springs carried by the frame and bearing against said standards and being under tension with a tendency to move the standards toward each other, arms transversely disposed with relation to each other and pivoted to the frame and bearing at their lower ends against the standards, toggle levers pivotally connected with the upper ends of the arms, an actuating lever pivoted upon the frame and being pivotally connected with the toggle levers, and a disk journaled for rotation upon the frame and carrying means for engaging and operating the actuating lever.

2. A device as described comprising a frame, standards pivoted thereto, chopping blades carried by the standards, springs carried by the frame and bearing against said standards and being under tension with a tendency to hold the standards toward each other, arms transversely disposed with relation to each other and pivoted at intermediate points to the frame, said arms bearing at their lower ends against the standards, toggle levers pivotally connected with the upper ends of the arms, an actuating lever fulcrumed upon the frame and being pivotally connected at one end portion with the said toggle levers, a disk journaled for rotation upon the frame, arms pivotally mounted at intermediate points upon the said disk and having end portions adapted to project beyond the periphery of the disk, and into the path of movement of the actuating lever, said disk having a laterally disposed hub lying in the path of movement of the inner ends of the arms which are pivotally mounted upon the disk.

In testimony that I claim the foregoing as my own, I have hereto affixed my signature in the presence of two witnesses.

FURNEY F. GREEN.

Witnesses:
L. CONNER PERRY,
EDNA F. LANDON.

Copies of this patent may be obtained for five cents each, by addressing the "Commissioner of Patents, Washington, D. C."